INVENTOR.
ALLAN D. HALLAMAN

United States Patent Office 3,498,684
Patented Mar. 3, 1970

3,498,684
TRACTION BELT
Allan D. Hallaman, Akron, Ohio, assignor to The B. F. Goodrich Company, New York, N.Y., a corporation of New York
Filed June 28, 1967, Ser. No. 649,673
Int. Cl. B62d 55/08, 55/18; B65g 15/30
U.S. Cl. 305—38                                 5 Claims

ABSTRACT OF THE DISCLOSURE

An elastomeric traction belt having lugs on its outer surface and reinforced with tension cords intermediate layers of independently functioning transverse cords of inextensible but flexible wire cord providing increased transverse stiffness.

BACKGROUND OF THE INVENTION

Snow traveling vehicles of the type used for sport or for other transportation of one or two persons commonly have the forward part of the vehicle body supported and steered by a pair of skis or skids while the rear portion is supported upon and the entire vehicle driven by one or more endless tracks. A track of this type is supported for travel about a suspension system of resiliently mounted rollers and is driven by engagement with one or more sprockets operatively connected to a suitable prime mover. Traction belts formed of reinforced elastomeric material have found widespread use in such applications.

A traction belt of the aforementioned type should have longitudinal flexibility to permit the belt to maintain compliance with uneven terrain and with the belt supporting and driving means, while transverse stiffness is desirable to enable the belt to track properly under tension over driving pulleys or sprockets and prevent undesirable deflection when obstacles are encountered. Moreover, a belt which has transverse stiffness is less subject to high-amplitude vibrations and lateral distortion when running under tension which vibrations and/or distortions tend to cause the belt to wander from its proper track over the pulleys.

Heretofore, one of the more common ways of providing transverse stiffness in a traction belt has been the incorporation of a woven fabric reinforcement. This however, has the disadvantage of increasing the longitudinal stiffness. When the longitudinal stiffness of the belt is increased the compliance of the belt is reduced and the belt is therefore less effective for traction over uneven and rough terrain. It also requires more power for driving due to the increased resistance of the belt to bending over the driving sprockets and rollers. Another common method that has been used for stiffening a traction belt transversely is the inclusion of rigid transverse bars embedded in the elastomeric material or the exterior attachment of metal or other rigid bars. However, the use of rigid bars embedded in the belt for transverse reinforcement is undesirable as the rigidity of the bars is a source of belt distortion when the belt is subjected to punching for forming sprocket holes or when subjected to localized impressions during use from hard objects such as rocks. Obviously, any local deflection of the belt sufficiently severe to produce inelastic bending of the transverse bars whether embedded or externally secured leaves the belt distorted and unserviceable.

SUMMARY OF THE INVENTION

The present invention solves the above mentioned problems by providing a belt of desired width having adequate transverse stiffness for use in providing power for tractive vehicles. Moreover, the transverse stiffness of the belt is achieved while retaining sufficient resilience so that undesirable deflection caused by severe external and driving forces do not leave the belt permanently distorted and unusable.

These features of the improved belt are secured in an elastomeric traction belt, reinforced with flexible longitudinal tension members which are resistant to tension loads yet provide the belt with the longitudinal flexibility required for ease of driving, by transversely stiffening it with layers of flexible, transversely extending members placed on opposite sides of the tension members and spaced closely adjacent the surfaces of the belt. The flexible transversely extending members act independently of the longitudinal tension members and hence do not decrease the longitudinal flexibility of the belt. The belt is provided with apertures uniformly spaced longitudinally for engagement with a driving sprocket and the outer surface of the belt preferably has a traction increasing pattern.

DETAILED DESCRIPTION

Figure 1:
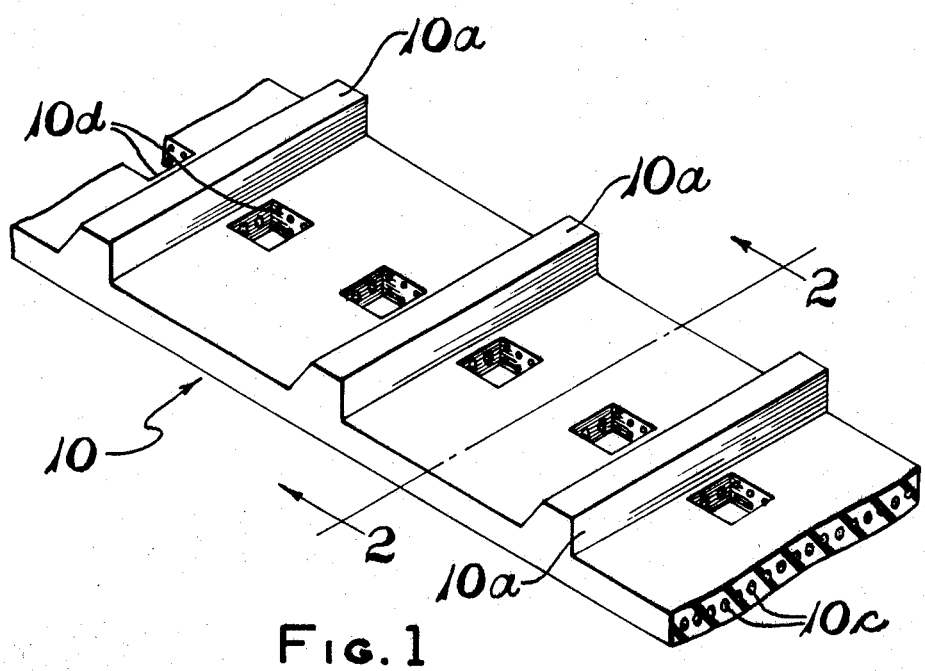
FIG. 1 is a perspective view of a portion of the presently preferred embodiment of the belt showing the latter provided with sprocket holes and having the outer surface provided with traction lugs.

Referring now to FIG. 1 of the drawings, the belt 10, which is of endless construction, is shown as provided with a traction increasing surface in the form of spaced transverse traction lugs 10a extending upon the outer surface of the belt. The nature of these lugs is specifically described and claimed in my copending application Ser. No. 590,755, filed Oct. 31, 1966. Apertures 10d of rectangular shape penetrating the thickness of the belt are shown evenly spaced along a line parallel to and intermediate the longitudinal edges of the belt for receiving the teeth of driving sprocket wheels. In the presently preferred embodiment of the invention only one row of apertures adapted to receive a sprocket is made in the belt. Where, however, it is convenient or necessary for purposes of power transmission, more than one row of sprocket apertures may be made in the belt to accommodate driving from more than one sprocket. In the presently desired form of the invention, the apertures for sprocket teeth are square in shape having a one inch side. The traction lugs or cleats 10a are shown extending continuously transversely of the width of the belt in the illustrated embodiment. However, any of several arrangement of lugs may be used, including transversely spaced or staggered arrangements and the invention does not require the use of the lug arrangement shown.

Figure 2:
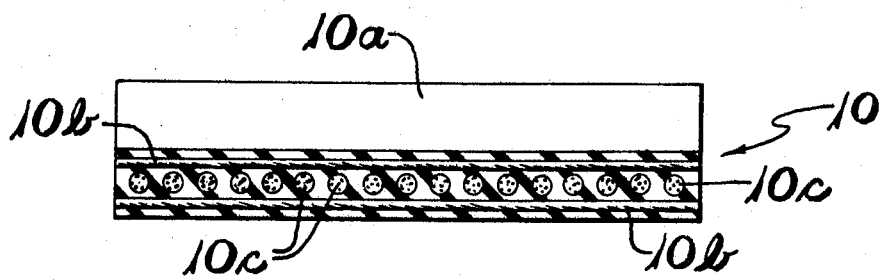
FIG. 2 is an enlarged sectional view taken along the section indicating line 2—2 of FIG. 1 showing the inner construction of the belt.

Referring to FIG. 2, the details of the belt structure and reinforcement are shown in enlarged cross-section for clarity. The body 10 of the belt is made of elastomeric material and has two opposite generally flat faces so that the belt is generally rectangular in cross-sectional shape. Individually continuous longitudinal tension resisting members 10c are positioned centrally through the thickness of the belt in closely spaced parallel relationship and preferably in a single layer. The tension members 10c are preferably substantially inextensible textile cords, but may also be made of any other suitable inextensible flexible material, stranded steel wire for example. Transverse reinforcing members 10b are placed in layers on opposite sides of the tension members. The transverse members 10b are made of stranded steel wire cord and are spaced closely adjacent the parallel faces of the belt body 10.

There are numerous combinations of diameters and spacings for the transverse members 10b and the invention does not require any one combination in particular to enable practice of the teachings of the invention. However, satisfactory results are achieved for belts having a width in the range of 14 to 16 inches when the transverse members are made of twisted together and/or braided steel filaments forming a cable or cord having a diameter in the range of .020–.050 inch, the members being spaced in the range of from 14 transverse cords per inch of belt length for the .020 inch diameter cords to 4 cords per inch of belt length for the .050 inch diameter cords. One specific construction of a belt 15½ inches wide which has proved satisfactory utilizes 0.037 diameter wire cords spaced from 10 to 14 cords per inch of belt length. In another satisfactory embodiment, the transverse members were 0.023 diameter wire cords spaced 14 cords per inch of belt length. Preferably, the .037 diameter wire cord is made of 21 single filaments of .0058 diameter comprising 6 wire strands each consisting of 3 twisted filaments, with the strands twisted around a three-filament core. The .023 diameter is preferably made of 6 filaments of .0098 diameter wire comprising 5 filaments twisted about a single core. Preferably, the wire filaments are each brass plated to prevent corrosion and increase adhesion to the elastomer.

In the preferred form of the invention a single layer of mutually parallel transverse cords 10b is used on each opposite side of the tension members 10c. The members 10b are preferably oriented substantially perpendicularly to the tension members 10c and in transversely or vertically aligned pairs. Placing the flexible transverse cords 10b closely adjacent the faces of the belt 10 permits the members 10b to function in a manner similar to the flanges of a beam in primarily resisting the tension and compression stresses induced by transverse deflection or bending; any shear stresses being absorbed by the elastomeric material of body 10 in a manner similar to the way a web of a flanged beam resists shear stresses. The transverse cords 10b function independently of the tension cords 10c in that longitudinal bending of the belt does not create any appreciable stresses in the transverse cords, yet transverse bending is resisted primarily by the transverse members. Therefore, the belt 10 is transversely stiffened without causing any appreciable decrease in the longitudinal flexibility of the belt. The flexible nature of the transverse cords 10b permits the belt to be distorted and deflected without permanent deformation of the belt.

The flexibility of the transverse cords also permits the belt to have sprocket apertures 10d formed therein after the belt is fabricated and vulcanized, without leaving the belt carcass distorted. In this regard, it should be noted that cutting and removal of portions of the transverse cords in forming the said sprocket apertures does not permanently distort or displace the complete or portions of cords which remain. Furthermore, the close spacing and flexible nature of the transverse cords provides resilient reinforcement around the periphery of the sprocket apertures for absorbing the pressure from driving contact with the sprocket teeth.

In the preferred form, the belt has only one layer of transverse cords 10b on each opposite side of the tension cords 10c. The invention, however, is not limited to this form and a plurality of layers of transverse cords 10b may be used in lieu of a single layer on opposite sides of the tension members. Other modifications and adaptations of the invention may be made by those skilled in the art.

I claim:
1. An elastomeric vehicular traction belt of endless construction comprising:
 (a) an elongated body of elastomeric material having opposite generally parallel inner and outer faces with the outer face having a plurality of traction increasing portions thereon;
 (b) a plurality of tension members embedded in said body extending continuously longitudinally in at least one planar layer and in spaced parallel relationship;
 (c) a plurality of transverse members of flexible yet inextensible stranded wire cords each comprising a plurality of metallic filaments with the cords longitudinally spaced an amount to provide 4–10 cords per inch of belt length embedded in said body and extending at substantially right angles to said tension members in at least two spaced parallel layers one on each opposite side of said tension members extending continuously longitudinally with the said layers being respectively spaced closely adjacent the said inner and said outer surfaces of said body; and
 (d) said belt having a plurality of uniformly spaced teeth-receiving apertures intermediate its longitudinal edges thereof.

2. The belt as defined in claim 1, wherein said tension members are a single layer of textile cord material.

3. The belt as defined in claim 1, wherein the diameter of the said transverse cords is in the range of 0.050 to 0.020 inch.

4. The belt as defined in claim 1, wherein said transverse members are spaced in pairs aligned in a plane generally perpendicular to said tension members.

5. The belt as defined in claim 3, wherein said apertures are rectangular in shape.

References Cited
UNITED STATES PATENTS

| | | | |
|---|---|---|---|
| 2,461,849 | 2/1949 | Slemmons | 305—38 |
| 2,476,828 | 7/1949 | Skromme | 305—38 |
| 2,708,978 | 5/1955 | Robitaille. | |
| 2,793,150 | 5/1957 | Deaves. | |
| 2,899,242 | 8/1959 | Bombardier | 305—38 |
| 3,144,930 | 8/1964 | Michels | 74—237 X |
| 3,285,677 | 11/1966 | Marier | 305—38 |

RICHARD J. JOHNSON, Primary Examiner

U.S. Cl. X.R.
74—237; 198—193